(12) United States Patent
Szfraniec et al.

(10) Patent No.: US 6,486,961 B1
(45) Date of Patent: Nov. 26, 2002

(54) SYSTEM AND METHOD FOR MEASURING GROUP DELAY BASED ON ZERO-CROSSINGS

(75) Inventors: Bogdan Szfraniec, Sunnyvale, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 22 days.

(21) Appl. No.: 09/851,758

(22) Filed: May 8, 2001

(51) Int. Cl.[7] ............................................. G01B 9/02
(52) U.S. Cl. ........................................ 356/477; 356/484
(58) Field of Search ............................... 356/73.1, 477, 356/484

(56) References Cited

U.S. PATENT DOCUMENTS

| | | | |
|---|---|---|---|
| 4,842,358 A | * 6/1989 | Hall | 250/205 |
| 5,390,017 A | 2/1995 | Ozeki et al. | 356/73.1 |
| 5,818,585 A | * 10/1998 | Davis et al. | 356/35.5 |
| 5,828,689 A | * 10/1998 | Epworth | 372/32 |

OTHER PUBLICATIONS

Johannes Skaar, "Measuring the Group Delay of Fiber Bragg Gratings by Use of End–Reflection Interference", Optics Letters, vol. 24, No. 15, Aug. 1, 1999, pp. 1020–1022.
Shellee D. Dyer, Kent B. Rochford and Allen H. Rose, "Fast and Accurate Low–Coherence Interferometric Measurement of Fiber Bragg Grating Dispersion and Reflectance", Optics Express, vol. 5, No. 11, Nov. 22, 1999, pp. 262–266.
David Sandel, Reinhold Noe, G. Heise and B. Borchert, "Optical Network Analysis and Longitudinal Structure Characterization of Fiber Bragg Grating", Journal of Lightwave Technology, vol. 16, No. 12, Dec. 1998, pp. 2435–2442.
Shellee D. Dyer and Kent B. Rochford, "A Fast and Accurate Measurement of Both Transmission and Reflection Group Delay in Fiber Bragg Gratings", Technical Digest Symposium on Optical Fiber Measurements, 2000 (NIST SP 953), pp. 169–172.
Mark Froggatt, Jason Moore and Turan Erdogan, "Full Complex Transmission and Reflection Characterization of a Bragg Grating in a Single Laser Sweep", Optical Fiber Communication Conference, Technical Digest Postconference Edition, Trends in Optics and Photonics vol. 37 (IEEE Cat. No. OOCH37079), 2000, vol. 2, pp. 22–24.
Graham Duck and Myo M. Ohn, "Distributed Bragg Grating Sensing with a Direct Group–Delay Measurement Technique", Optics Letters, vol. 25, No. 2, Jan. 15, 2000, pp. 90–92.

* cited by examiner

Primary Examiner—David P. Porta

(57) ABSTRACT

A system and method for measuring the group delay of an optical device under test (DUT) utilizes an optical frequency counter in conjunction with a test interferometer to compensate for the non-uniform frequency changes of an input optical signal used by the test interferometer to measure the group delay. The group delay of the optical DUT is measured using the zero-crossings of an AC coupled heterodyne beat signal produced by the test interferometer from the input optical signal. In the measurement of the group delay, phase changes in the heterodyne beat signal caused by the non-uniform frequency changes of the input optical signal are compensated by using the measured optical frequency of the input optical signal. The optical frequency is detected by the optical frequency counter. The detected optical frequency is indicative of the non-uniform frequency changes of the input optical signal.

27 Claims, 12 Drawing Sheets

SYSTEM AND METHOD FOR MEASURING GROUP DELAY BASED ON ZERO-CROSSINGS

FIELD OF THE INVENTION

The invention relates generally to the field of optical network analysis, and more particularly to a system and method for determining the phase response of an optical component under test.

BACKGROUND OF THE INVENTION

An optical network analyzer is a vital tool for determining optical characteristics of optical components, such as fiber Bragg gratings. The optical characteristics determined by an optical network analyzer may include reflectance and transmittance of a particular two port or multiport optical component under test. The reflection or transmission characteristics of an optical component under test are typically determined by measuring the amplitude and phase of optical signals that have been reflected by or transmitted through the component. The phase response characteristics of an optical component under test are often described by group delay or dispersion.

Most conventional group delay measurement techniques were developed for optical network analyzers that utilize non-continuously tunable laser sources. A non-continuously tunable laser source is a laser source that can be tuned across a predefined range of frequencies in discrete frequency steps. A typical technique to measure group delay is to apply an electrical stimulus in the form of intensity or phase modulation to an optical signal, and then measure the electrical response of the transmitted or reflected optical signals using well known phase sensitive electrical detection device, e.g., a lock-in amplifier or an electrical network analyzer. A concern with this technique is that the group delay measurement is indirect, which limits the accuracy of the measurement. In addition, the technique requires a long measurement time to obtain an accurate result. Consequently, a long-term stability of the test setup is required to effectively utilize the technique.

However, continuously tunable laser sources have recently become available. A continuously tunable laser source can continuously sweep a predefined range of frequencies without frequency jumps or mode hops. The availability of continuously tunable laser sources has allowed for development of interferometric methods for measuring the group delay of optical components. The interferometric methods are based on direct measurements of phase differences between interfering optical signals. Typically, Fourier analysis of a heterodyne beat frequency directly related to the sweeping optical frequency of a continuously tunable laser source is used to measure the phase, and consequently, the group delay. A concern with the interferometric methods using Fourier analysis is that the frequency sweep of a continuously tunable laser source is non-uniform. The non-uniformity of the frequency sweep causes a similar non-uniformity in the resulting beat frequency, which introduces an uncertainty in the calculation of the phase by means of the Fourier analysis.

In view of this concern, there is a need for a system and method for efficiently and accurately measuring the group delay of an optical component under test using a continuously tunable laser source.

SUMMARY OF THE INVENTION

A system and method for measuring the group delay of an optical device under test (DUT) utilizes an optical frequency counter in conjunction with a test interferometer to compensate for the non-uniform frequency changes of an input optical signal used by the test interferometer to measure the group delay. The group delay of the optical DUT is measured using the zero-crossings of an AC coupled heterodyne beat signal produced by the test interferometer from the input optical signal. In the measurement of the group delay, phase changes in the heterodyne beat signal caused by the non-uniform frequency changes of the input optical signal are compensated by using the optical frequency counter. In an exemplary embodiment, the optical frequency counter includes a reference interferometer. In this embodiment, the zero-crossings of a reference AC coupled heterodyne beat signal produced by the reference interferometer from the input optical signal are used to detect the optical frequency of the input optical signal and to compensate for the non-uniform frequency changes of the input optical signal. The wavelengths of the reference heterodyne beat signal are measured by detecting the zero-crossings of the reference heterodyne beat signal.

A method of analyzing an optical characteristic of an optical device under test (DUT) in accordance with the present invention includes the steps of generating an input optical signal having a frequency that varies with time into a test interferometer that includes the optical DUT, detecting DUT zero-crossings of a DUT heterodyne beat signal from the test interferometer, and computing the group delay of the optical DUT using a derivative of a DUT zero-crossings function defined by the DUT zero-crossings with respect to one of time and optical frequency of the DUT zero-crossings function. The computed group delay is indicative of a phase response of the optical DUT.

The method may further include the steps of detecting the optical frequency of the input optical signal and compensating for the non-uniform frequency changes of the input optical signal. This step may further include detecting zero-crossings of a reference heterodyne beat signal from a reference interferometer.

In an embodiment, the step of computing the group delay includes calculating the derivative of the DUT zero-crossings function with respect to time, which provides information about changes in phase of the DUT heterodyne beat signal. In this embodiment, the method may further include steps of detecting reference zero-crossings of a reference heterodyne beat signal from a reference interferometer, and calculating a derivative of a reference zero-crossings function defined by the reference zero-crossings with respect to time, which provides information about changes in optical frequency of the input optical signal in the DUT and reference interferometers. In an embodiment, the group delay of the optical DUT is computed by dividing the derivative of DUT zero-crossing function by the derivative of the reference zero-crossings function.

In another embodiment, the step of computing the group delay includes calculating the derivative of the DUT zero-crossings function with respect to optical frequency. The derivative of the DUT zero-crossing function with respect to optical frequency may be calculated by sampling the DUT heterodyne beat signal in equal frequency increments. The DUT heterodyne beat signal may be sampled in equal frequency increments using a clocking signal, which may be derived by detecting the optical frequency of the input optical signal. In an embodiment, reference zero-crossings of a reference interferometer are used as the clocking signal to sample the DUT heterodyne beat signal in equal frequency increments.

A system for analyzing an optical characteristic of an optical DUT in accordance with the present invention includes a light source, a test interferometer, a DUT zero-crossing detector, and a processor. The light source is configured to generate an input optical signal having a frequency that varies with time. The DUT zero-crossing detector is configured to detect DUT zero-crossings of a DUT heterodyne beat signal from the test interferometer. The processor is configured to calculate a derivative of a DUT zero-crossings function defined by the DUT zero-crossings with respect to a variable of the DUT zero-crossings function. In addition, the processor is configured to compute the group delay of the optical DUT using the derivative of the DUT zero-crossings function.

The system may further include an optical frequency counter that is configured to detect the optical frequency of the input optical signal. The detected optical frequency is used to compensate for the frequency sweep non-uniformity of the light source. The optical frequency counter may include a reference interferometer that generates a reference heterodyne beat signal from the input optical signal. In this embodiment, the optical frequency counter may be configured to detect the zero-crossings of the reference heterodyne beat signal from the reference interfero meter to measure the optical frequency of the input optical signal.

In an embodiment, the processor of the system is configured to calculate the derivative of the DUT zero-crossings function with respect to time. In this embodiment, the system may include a reference interferometer and a reference zero-crossing detector. The reference zero-crossing detector is configured to detect reference zero-crossings of the reference heterodyne beat signal from the reference interferometer. In this embodiment, the processor is configured to calculate a derivative of a reference zero-crossings function defined by the reference zero-crossings with respect to time. The group delay of the optical DUT is computed by dividing the derivative of DUT zero-crossings function by the derivative of the reference zero-crossings function.

In another embodiment, the processor of the system is configured to calculate the derivative of the DUT zero-crossings function with respect to optical frequency. In this embodiment, the system may further include a wave converter that is coupled to a reference interferometer. The wave converter is configured to convert a reference beat signal from the reference interferometer from a sinusoidal waveform to a rectangular-like waveform. The converted signal is used as a clocking signal to sample the DUT heterodyne beat signal in equal frequency increment.

An advantage of the invention is that fast Fourier transform is not required to compute the group delay, which simplifies the data processing when using a non-uniform tunable laser source.

Other aspects and advantages of the present invention will become apparent from the following detailed description, taken in conjunction with the accompanying drawings, illustrated by way of example of the principles of the invention.

DETAILED DESCRIPTION

Figure 1:
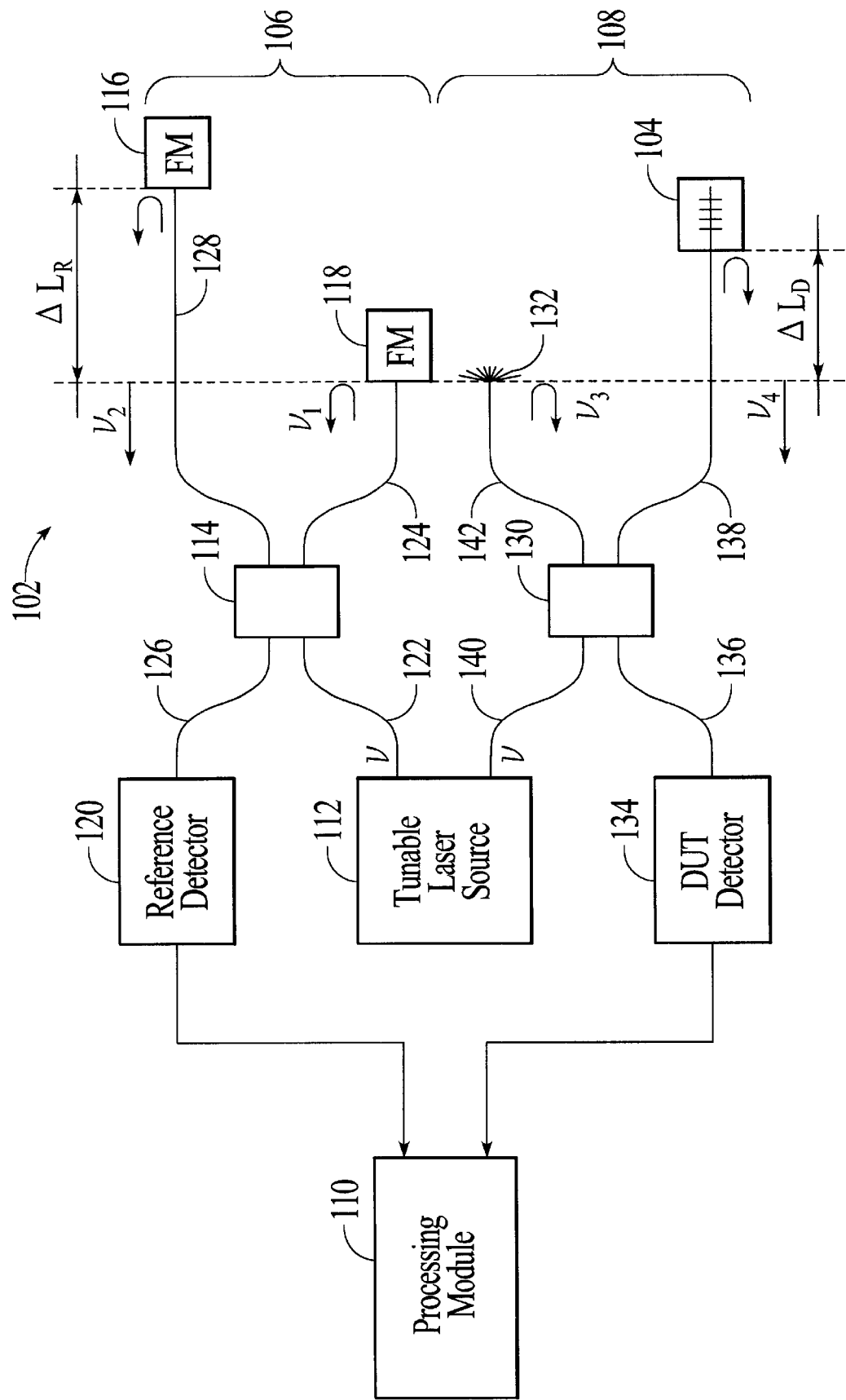
FIG. 1 is a block diagram of an optical network analyzer configured to perform reflectance measurement in accordance with the present invention.

With reference to FIG. 1, an optical network analyzer 102 in accordance with the present invention is shown. The analyzer measures optical characteristics of an optical device under test (DUT) 104. In particular, the analyzer computes the group delay of the DUT. As an example, the optical DUT may be a fiber Bragg grating, although the optical DUT may be any optical component. The optical network analyzer computes the group delay of the optical DUT in an efficient manner using an interferometric method based on zero-crossings of AC coupled heterodyne beat signals.

The optical network analyzer 102 includes a reference interferometer 106, a test interferometer 108, and a processing module 110. As illustrated in FIG. 1, the reference and test interferometers are configured as Michelson interferometers to measure the reflective characteristics of the optical DUT 104. However, other types of interferometers could instead be used. For example, the interferometers 106 and 108 may be configured as Mach-Zehnder interferometers to measure the transmissive characteristics of the optical DUT. The reference interferometer and the test interferometer both utilize a continuously tunable laser source 112. The continuously tunable laser source is configured to generate an optical signal having a frequency that continuously sweeps across a predefined range of frequencies in a non-uniform manner. That is, the rate of change in frequency of the optical signal generated by the tunable laser source varies with time as the predefined range of frequencies is swept.

As explained in detail below, the group delay of the optical DUT 104 is computed by measuring the phase changes of an AC coupled heterodyne beat signal from the test interferometer 108 caused by the optical DUT. The heterodyne beat signal is produced from an input optical signal generated by the continuously tunable laser source 112. However, due to the frequency sweep non-uniformity of the laser source, the frequency changes of the input optical signal are non-uniform, which introduces undesired phase changes into the heterodyne beat signal. The reference interferometer 106 and the processing module 110 forms an optical frequency counter that measures the undesired phase changes caused by the non-uniform frequency changes of the input optical signal. The reference interferometer produces a reference heterodyne beat signal that includes only the phase changes caused by the frequency sweep non-uniformity of the tunable laser source. The reference heterodyne beat signal is then detected to measure the undesired phase changes. Since the measured phase changes are common to both interferometers, the distortions due to the non-uniform frequency sweep can be removed from the heterodyne beat signal produced by the test interferometer using the reference heterodyne beat signal.

The reference interferometer 106 of the optical network analyzer 102 includes the continuously tunable laser source 112, an optical coupler 114, Faraday mirrors 116 and 118, and a reference detector 120. These components of the reference interferometer are connected to each other by optical fibers 122, 124, 126 and 128. The optical fiber 122 connects the tunable laser source to the optical coupler, while the optical fiber 126 connects the reference detector to the optical coupler. Similarly, the optical fiber 124 connects the optical coupler to the Faraday mirror 118, while the optical fiber 128 connects the optical coupler to the Faraday mirror 116. The optical coupler 114 and the optical fibers 122, 124, 126 and 128 are single mode (SM) components. The length of the optical fiber 128 differs from the length of the optical fiber 124 by the distance $\Delta L_R$, which introduces delay into the reference interferometer and defines its free spectral range (FSR).

In operation, the tunable laser source 112 continuously generates an optical signal in a sweeping range of frequencies. As an example, the tunable laser source may sweep approximately 140 nm wavelength range from 1470 nm wavelength or from 1510 nm wavelength. The optical signal generated by the tunable laser source is transmitted to the optical coupler 114 through the optical fiber 122. The optical coupler then divides the optical signal into two optical signals so that the divided optical signals are transmitted to the Faraday mirrors 116 and 118 through the optical fibers 128 and 124, respectively. The optical signal transmitted through the optical fiber 128 is reflected back to the optical coupler by the Faraday mirror 116 at the end of the optical fiber 128. Similarly, the optical signal transmitted through the optical fiber 124 is reflected back to the optical coupler by the Faraday mirror 118 at the end of the optical fiber 124. The Faraday mirrors 116 and 118 always reflect light in an orthogonal polarization state, thereby ensuring that the returning optical signals have nearly the same polarization state.

Due to the extra distance traveled by the optical signal in the optical fiber 128, the frequency of the returning optical signal in the optical fiber 128 differs from the frequency of the returning optical signal in the optical fiber 124 at a given moment in time. As illustrated in FIG. 1, the frequency of the returning optical signal in the optical fiber 124 is denoted by $v_1$ and the frequency of the returning optical signal in the optical fiber 128 is denoted by $v_2$. Assuming the tunable laser source 112 sweeps the predefined range of frequencies at the rate $\gamma$, the optical frequencies $v_1$ and $v_2$ can be expressed as:

$$v_1 = \gamma \cdot t + v_0$$

$$v_2 = \gamma \cdot t - \gamma \cdot \tau + v_0$$

where $v_0$ is the initial optical frequency of the tunable laser source and $\tau$ is the round trip delay in the length $\Delta L_R$ of the optical fiber 128. The round trip delay $\tau$ is defined as:

$$\tau = \frac{2n \cdot \Delta L_R}{c},$$

where n is the refractive index of the optical fiber 128 and c is the speed of light in vacuum. Assuming the constant sweep rate, $\gamma$, the frequency difference between the returning optical signals in the optical fibers 124 and 128 is:

$$\Delta v = \gamma \cdot \tau.$$

The reference interferometer 106 is assumed to be non-dispersive, i.e., $\tau$ does not depend on the optical frequency of the optical signals or $\tau$ has been compensated for dispersion. The phase difference between the two reflected signals can then be expressed as:

$$\Theta = 2\pi \Delta v t + \Theta_0 = 2\pi \gamma \tau t + \Theta_0,$$

where $2\Delta v$ is the angular frequency difference.

The returning optical signals in the optical fibers 124 and 128 are combined at the optical coupler 114 and transmitted to the reference detector 120 through the optical fiber 126. When combined, the optical signal returning from the optical fiber 124 interferes with the optical signal returning from the optical fiber 128. The intensity of the interfering optical signals observed at the reference detector can be expressed as:

$$I = I_0 + I_0 \cos(2\pi \gamma \tau t + \Theta_0)$$

with the assumption that the polarization state of the returning optical signals is the same. The term $I_0 \cos(2\pi\gamma\tau t + \Theta_0)$ defines the heterodyne beat signal produced by the returning optical signals. At the reference detector 120, the heterodyne beat signal is AC coupled by removing the DC component of the signal. The AC coupled heterodyne beat signal is then transmitted to the processing module 110 for signal processing.

The test interferometer 108 of the optical network analyzer 102 includes the continuously tunable laser source 112, an optical coupler 130, a mirror 132, the optical DUT 104 and a DUT detector 134. Similar to the reference interferometer 106, the components of the test interferometer are connected to each other by optical fibers 136, 138, 140 and 142. The optical fiber 140 connects the tunable laser source 112 to the optical coupler 130, while the optical fiber 136 connects the DUT detector 134 to the optical coupler. Similarly, the optical fiber 142 connects the optical coupler to the mirror 132, which may be a gold mirror, while the optical fiber 138 connects the optical coupler to the optical DUT 104. An additional polarization controller may be used in one of the arms to match the polarization states of the returning optical signals. The optical coupler 130 and the optical fibers 136, 138, 140 and 142 are also single mode (SM) components. The length of the optical fiber 138 differs from the length of the optical fiber 142 by the distance $\Delta L_D$, which introduces delay into the test interferometer and defines its free spectral range.

The operation of the test interferometer 108 is similar to the operation of the reference interferometer 106. However, the round trip delay $\tau_{DUT}$ for the test interferometer is dependent on the frequency of the optical signal from the tunable laser source 112 due to the dispersion within the optical DUT 104, or expressed mathematically, $\tau_{DUT}=\tau_{DUT}(\nu)$. The phase response of the optical DUT can be derived by measuring changes in phase of the heterodyne beat signal observed at the DUT detector 134. The heterodyne beat signal is produced by the returning optical signals in the optical fibers 138 and 142 when combined by the optical coupler 130 and detected at the DUT detector 134.

The phase of the heterodyne beat signal of the test interferometer 108 is modified by the sweep non-uniformity of the tunable laser source 112. That is, the fact that the tunable laser source sweeps frequencies in a non-uniform manner with respect to time introduces additional phase shift into the phase of the heterodyne beat signal detected at the DUT detector 134 of the test interferometer 108. The same phenomenon exists for the reference interferometer 106. Therefore, both interferometers contain information about the non-uniform frequency sweep of the tunable laser source 112. The effect of the non-uniform frequency sweep by the tunable laser source is described below with reference to FIGS. 2, 3, 4, 5 and 6.

Figure 2:
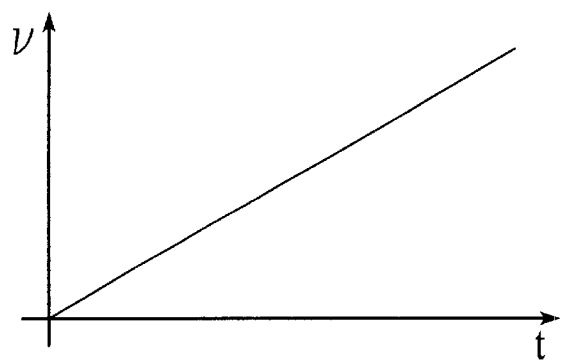
FIG. 2 illustrates the frequency sweep of an ideal continuously tunable laser source with respect to time.
Figure 3:
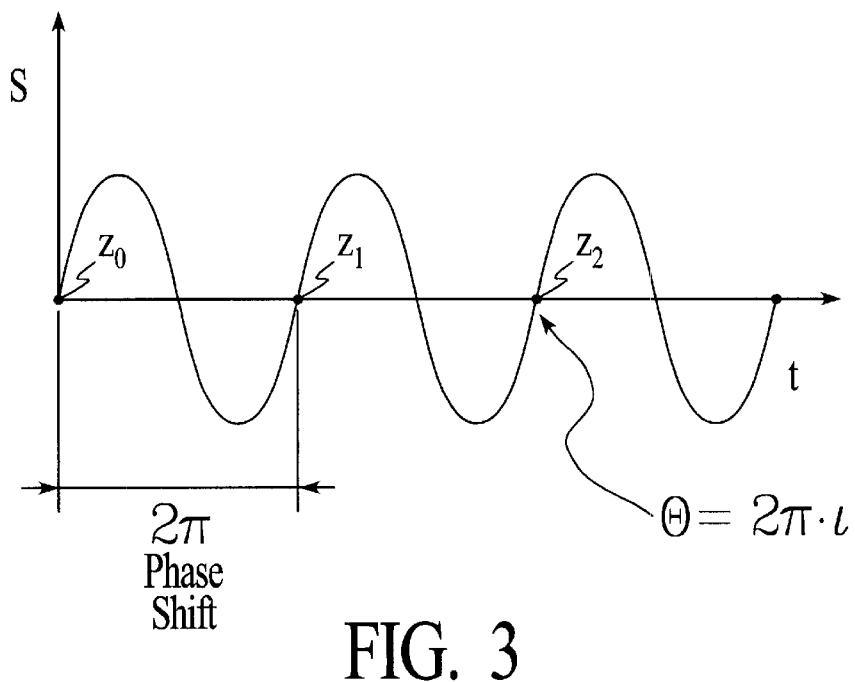
FIG. 3 illustrates the AC coupled heterodyne beat signal when an ideal continuously tunable laser source is used.
Figure 4:
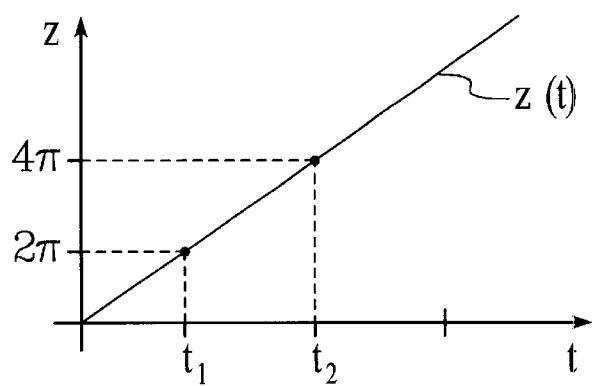
FIG. 4 illustrates a function z(t) defined by the zero-crossings of the heterodyne beat signal of FIG. 3.

Assuming that the tunable laser source 112 is an ideal tunable laser source that continuously sweeps the predefined range of frequencies uniformly with respect to time, the change of frequency with respect to time for the optical signals generated by the laser source is linear, as illustrated in FIG. 2. Consequently, the resulting AC coupled heterodyne beat signal is a pure sine wave with uniformly spaced, positive slope zero-crossings, e.g., zero-crossings $z_0$, $z_1$, and $z_2$ illustrated in FIG. 3. Although the present invention is described as using the positive slope zero-crossings, the negative slope zero-crossings can be alternatively used. Using these zero-crossings, a function z(t) can be defined, which identifies the phase of the heterodyne beat signal, as illustrated in FIG. 4. The function z(t) takes discrete values of $z_1=2\pi \cdot i$ at zero-crossing points $t_i=i/\gamma\tau$, as shown in FIG. 4. Therefore, the function z for an ideal tunable laser source is a linear function.

Figure 5:
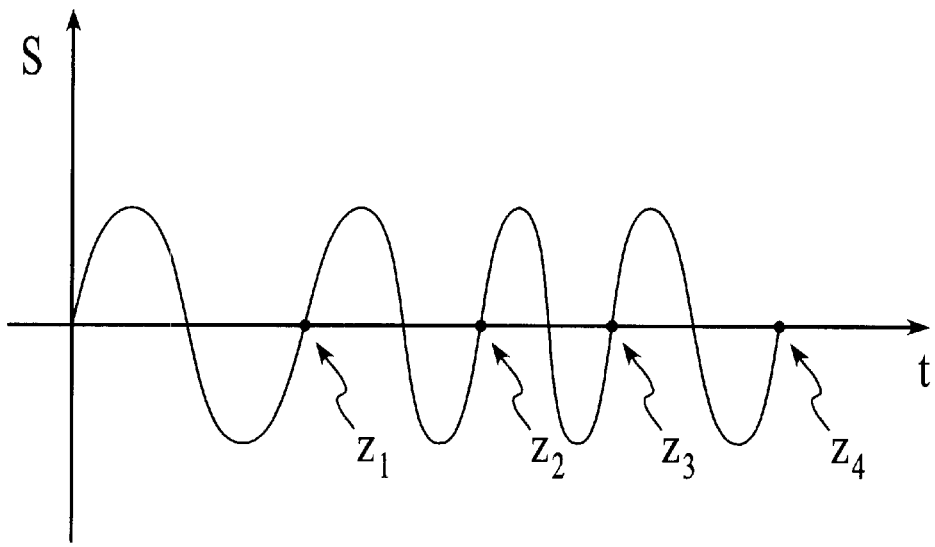
FIG. 5 illustrates the AC coupled heterodyne beat signal when a continuously tunable laser source that sweeps frequencies non-uniformly with respect to time is used.
Figure 6:
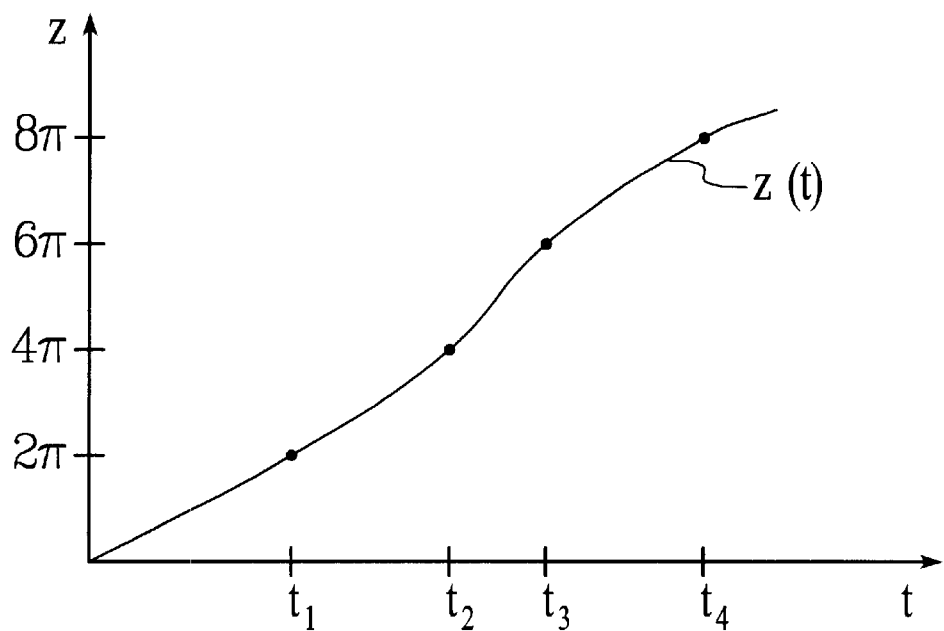
FIG. 6 illustrates a function z(t) defined by the zero-crossings of the heterodyne beat signal of FIG. 5.

However, for the tunable laser source 112 which sweeps frequencies non-uniformly, the positive slope zero-crossings of the heterodyne beat signal are non-uniform, as illustrated in FIG. 5. Consequently, the function z(t) defined by these non-uniform zero-crossings is non-linear, as illustrated in FIG. 6. Therefore, changes in phase of the heterodyne beat signal at the DUT detector 134 and at the reference detector 120 are strongly influenced by the sweep non-uniformity of the tunable laser source. The phase changes due to the dispersive DUT characteristics observed at the DUT detector 134 are indistinguishable from and dominated by phase changes induced by the sweep non-uniformity of the tunable laser source.

The optical network analyzer 102 resolves this problem by using the positive slope zero-crossings from the reference interferometer 106 to effectively "compensate" for the non-uniformity of the tunable laser source 112. A non-linear function z(t) of FIG. 6 represent a typical behavior of the phase of the heterodyne beat signals from both the reference interferometer 106 and the test interferometer 108. The function for the test interferometer 108 is denoted herein as $z_D(t)$, while the function for the reference interferometer 106 is denoted herein as $z_R(t)$. Since function z(t) describes phase, the functions for the DUT and reference interferometers can be expressed as:

$$z_D(t)=\Theta(t) \text{ and} \tag{1}$$

$$z_R(t)=\Theta_R(t), \tag{2}$$

where $\Theta(t)$ and $\Theta_R(t)$ describe the phase of the heterodyne beat signals in DUT and reference interferometers, respectively.

However, for the non-dispersive reference interferometer 106, the phase is proportional to the optical frequency $\nu$ of the interfering optical signals. Therefore, the function $z_R(t)$ can be expressed as:

$$z_R(t)=\Theta_R(t)=2\pi\tau \int \gamma(t)dt.$$

Since $\int \gamma(t)dt=\nu(t)$ and $2\pi\nu(t)=\omega(t)$, where $\omega(t)$ is the angular optical frequency and $\tau$ is the round trip delay, the function $z_R(t)$ can also be expressed as:

$$z_R(t)=\omega(t)\cdot\tau. \tag{3}$$

Figure 7:
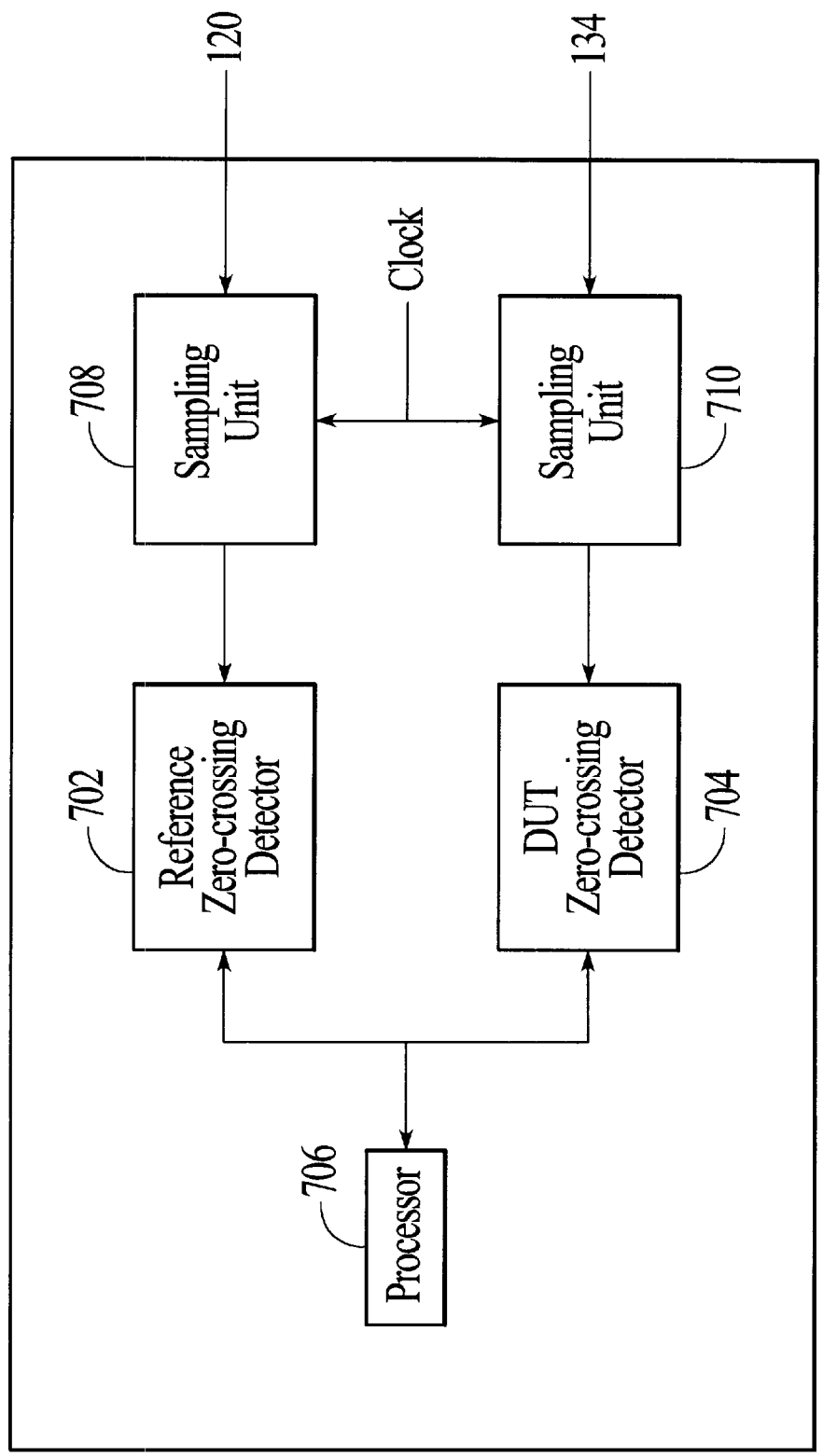
FIG. 7 is a block diagram of a processing module of the optical network analyzer in accordance with a first embodiment of the invention.

In a first embodiment, the processing module 110 of the optical network analyzer 102 computes the group delay of the optical DUT 104 directly from the positive slope zero-crossings of the reference heterodyne beat signal and the DUT heterodyne beat signal. In this embodiment, the processing module includes a reference zero-crossing detector 702, a DUT zero-crossing detector 704, a processor 706, and sampling units 708 and 710, as shown in FIG. 7. These components of the processing module may be implemented in any combination of hardware, software and firmware. The sampling units 708 and 710 sample the heterodyne beat signals from the reference and DUT detectors 120 and 134, respectively, in equal time increments using a clock signal. The reference zero-crossing detector operates to detect positive slope zero-crossings of the sampled reference heterodyne beat signal. Similarly, the DUT zero-crossing detector operates to detect positive slope zero-crossings of the sampled DUT heterodyne beat signal. The processor then uses the detected zero-crossings from both the reference zero-crossing detector and DUT zero-crossing detector to compute the group delay of the optical DUT 104.

Figure 8:
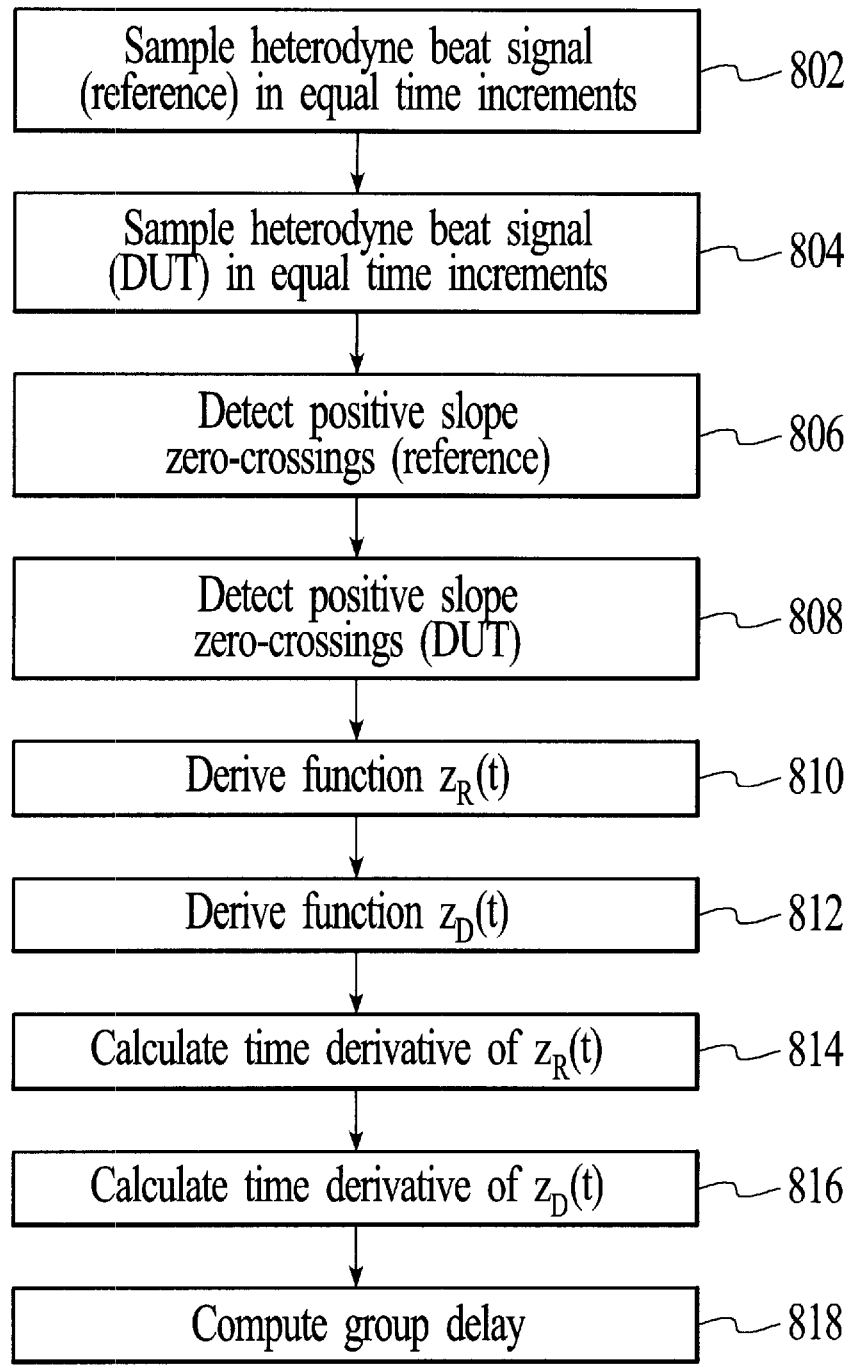
FIG. 8 is a process flow diagram of the operation of the processing module in accordance with the first embodiment.

The operation of the processing module 110 in accordance with the first embodiment is described with reference to FIG. 8. At step 802, the heterodyne beat signal from the reference detector 120 is sampled in equal time increments by the sampling unit 708 using a clock signal. Similarly, at step 804, the heterodyne beat signal from the DUT detector 134 is sampled in equal time increments by the sampling unit 710 using the same clock signal. Next, at step 806, positive slope zero-crossings of the sampled reference heterodyne beat signal are detected by the reference zero-crossing detector 702 of the processing module 110. Similarly, at step 808, positive zero-crossings of the sampled DUT heterodyne beat signal are detected by the DUT zero-crossing detector 704.

Figure 9:
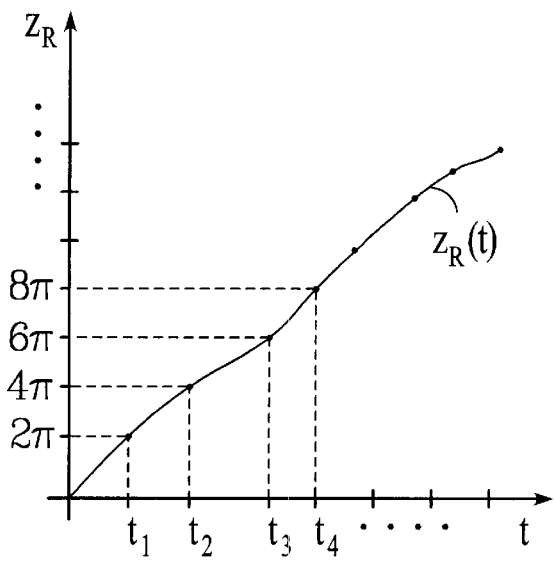
FIG. 9 illustrates a function $z_R(t)$ defined by the zero-crossings of an AC coupled heterodyne beat signal produced by a reference interferometer of the optical network analyzer.
Figure 10:
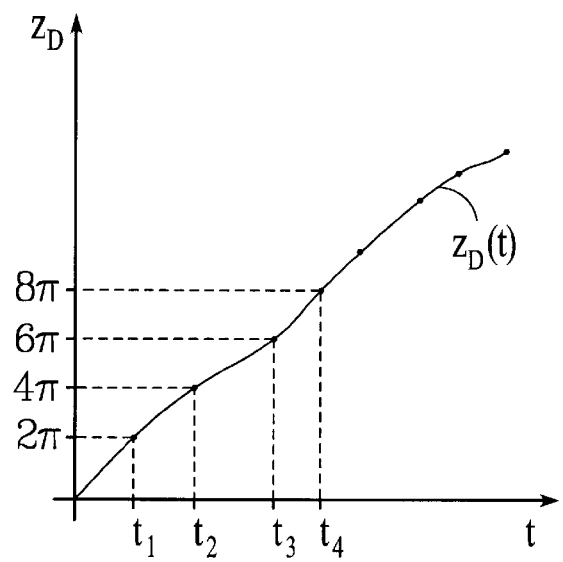
FIG. 10 illustrates a function $z_D(t)$ defined by the zero-crossings of an AC coupled heterodyne beat signal produced by a test interferometer of the optical network analyzer.

Next, at step 810, a function $z_R(t)$ is derived by the processor 706 using the zero-crossings detected by the reference zero-crossing detector 702. Similarly, at step 812, a function $z_D(t)$ is derived by the processor using the zero-crossings detected by the DUT zero-crossing detector 704. Examples of functions $z_R(t)$ and $z_D(t)$ that may be derived by the processor are shown in FIGS. 9 and 10, respectively. The depicted function $z_R(t)$ includes zero-crossing points that are non-uniformly spaced in time, which reflects the non-uniformity of the frequency sweep of the tunable laser source 112. The depicted function $z_D(t)$ also includes zero-crossing points that are non-uniformly spaced in time. However, the non-uniform spacing of the zero-crossing points in the function $z_D(t)$ includes information about the phase response of the optical DUT 104, as well as information about the non-uniformity of the frequency sweep of the tunable laser source. The function $z_D(t)$ may be derived from the detected zero-crossings using various methods. One of the methods is to simply connect the detected zero-crossings to derive the function $z_D(t)$. Other methods include performing a polynomial fit or a least square fit of the detected zero-crossings to derive the function $z_D(t)$.

Figure 11:
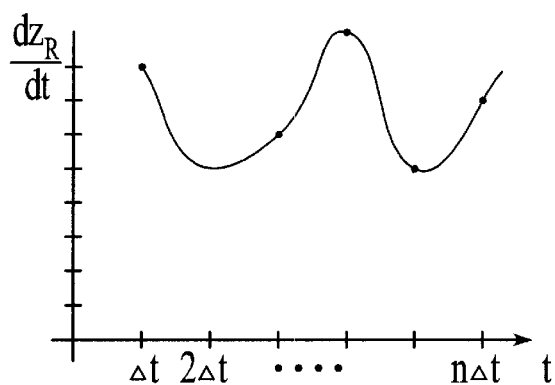
FIG. 11 illustrates the derivative of the function $z_R(t)$ with respect to time.
Figure 12:
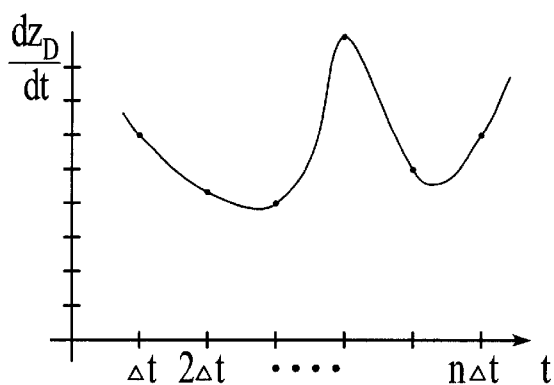
FIG. 12 illustrates the derivative of the function $z_D(t)$ with respect to time.

Next, at step 814, a derivative of the function $z_R(t)$ with respect to time is calculated by the processor 706. Similarly, a derivative of the function $z_D(t)$ with respect to time is calculated by the processor, at step 816. Numerically, the time derivatives of the functions $z_R(t)$ and $z_D(t)$ may be estimated by resampling the functions $z_R(t)$ and $z_D(t)$ in equal time increments and then using known numerical algorithms for derivative calculations. An alternative numerical method is to calculate derivatives $dt/dz_D$ and $dt/dz_R$, since adjacent positive slope zeros are spaced equally by $2\pi$, as previously described. Time derivatives of the exemplary functions $z_R(t)$ and $z_D(t)$ are illustrated in FIGS. 11 and 12. At step 818, the group delay $\tau_g$ for the optical DUT 104 is computed by the processor using the following equation.

$$\tau_R = \frac{\frac{dz_D}{dt}}{\frac{dz_R}{dt}} \cdot \tau.$$

The above equation can be validated as follows. The standard definition for group delay $\tau_g$ is expressed as:

$$\tau_R = \frac{d\Theta}{d\omega}.$$

From the equations (1) and (3), $\Theta(t)=z_D(t)$ and $$\omega(t) = \frac{z_R(t)}{\tau}.$$

Therefore, $$\frac{d\Theta(t)}{dt} = \frac{dz_D(t)}{dt} \qquad (4)$$

and $$\frac{d\omega(t)}{dt} = \frac{dz_R(t)}{dt} \cdot \frac{1}{\tau}. \qquad (5)$$

Consequently, $$\tau_g = \frac{\frac{d\Theta(t)}{dt}}{\frac{d\omega(t)}{dt}} = \frac{\frac{dz_D(t)}{dt}}{\frac{dz_R(t)}{dt}} \cdot \tau.$$

Figure 13:
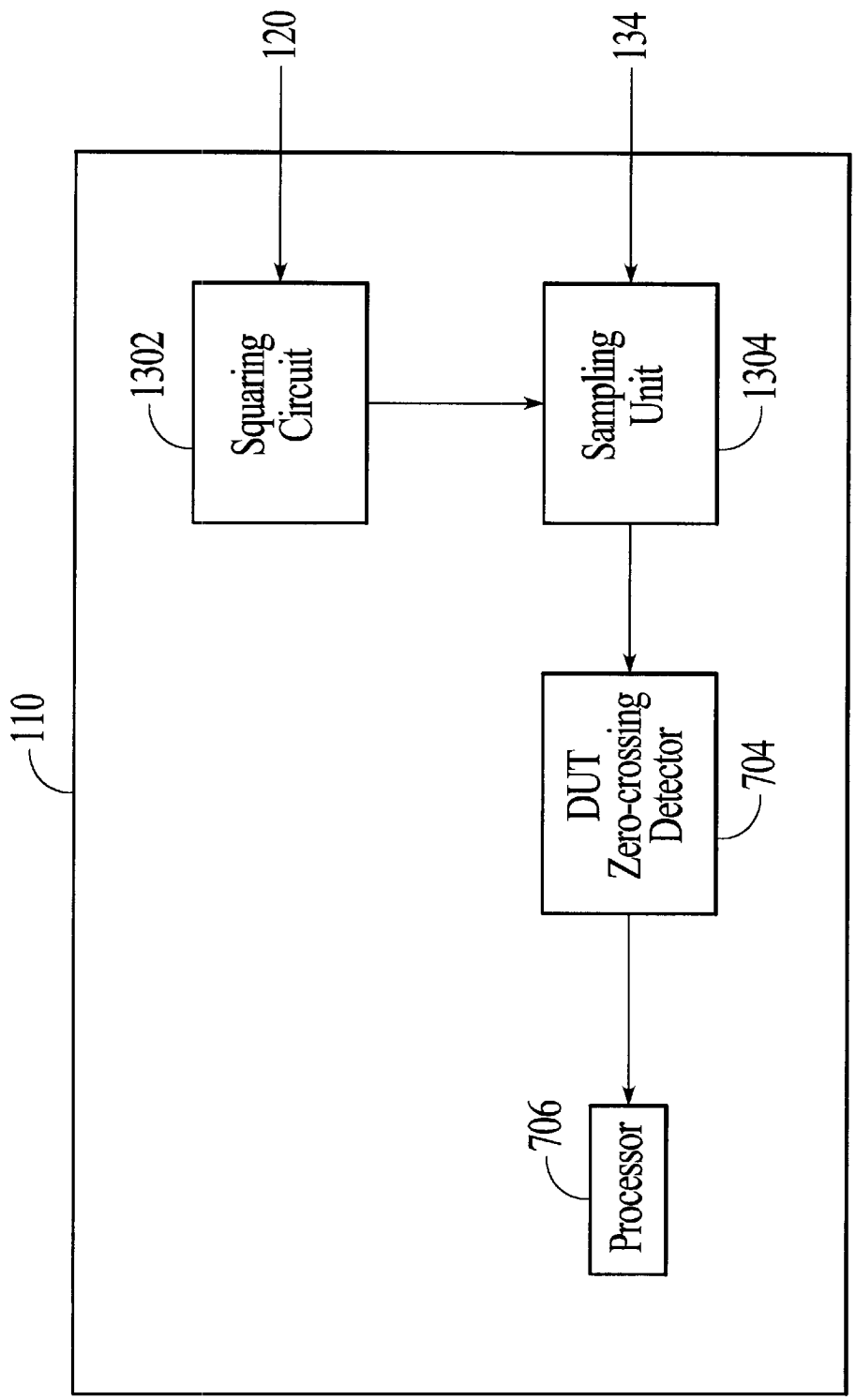
FIG. 13 is a block diagram of the processing module of the optical network analyzer in accordance with a hardware-based sampling approach of a second embodiment of the invention.

In a second embodiment, the processing module 110 of the optical network analyzer 102 operates to compute the group delay of the optical DUT 104 by using the positive slope zero-crossings of the reference interferometer 106 to clock the data acquisition of the beat frequency from the test interferometer in equal frequency increments. In a hardware-based sampling approach, the processing module includes the DUT zero-crossing detector 704, a squaring circuit 1302, a sampling unit 1304, and the processor 706, as shown in FIG. 13. The squaring circuit operates to convert the heterodyne beat signal received by the reference detector 120 of the reference interferometer 106 from a sinusoidal waveform to a rectangular waveform. As an example, the squaring circuit may be a Schmitt trigger. The edges of the resulting rectangular waveform are then used by the sampling unit 1304 to sample the heterodyne beat signal from the test interferometer 108. Since adjacent positive slope zero-crossings of the reference heterodyne signal by definition are separated by $2\pi$ and the interferometer is non-dispersive, the sampled data points of the DUT heterodyne beat signal are equally spaced in optical frequency (wavelength). After the sampling, the DUT zero-crossing detector operates to detect positive slope zero-crossings of the sampled heterodyne beat signal. The processor 706 then operates to derive the function $z_D(v)$ from the positive slope zero-crossings detected by the DUT zero-crossing detector. Similar to the derivation of the function $z_D(t)$, the function $z_D(v)$ may be derived from the detected zero-crossings using various methods. The processor uses the function $z_D(v)$ to compute the group delay for the optical DUT 104.

Figure 14:
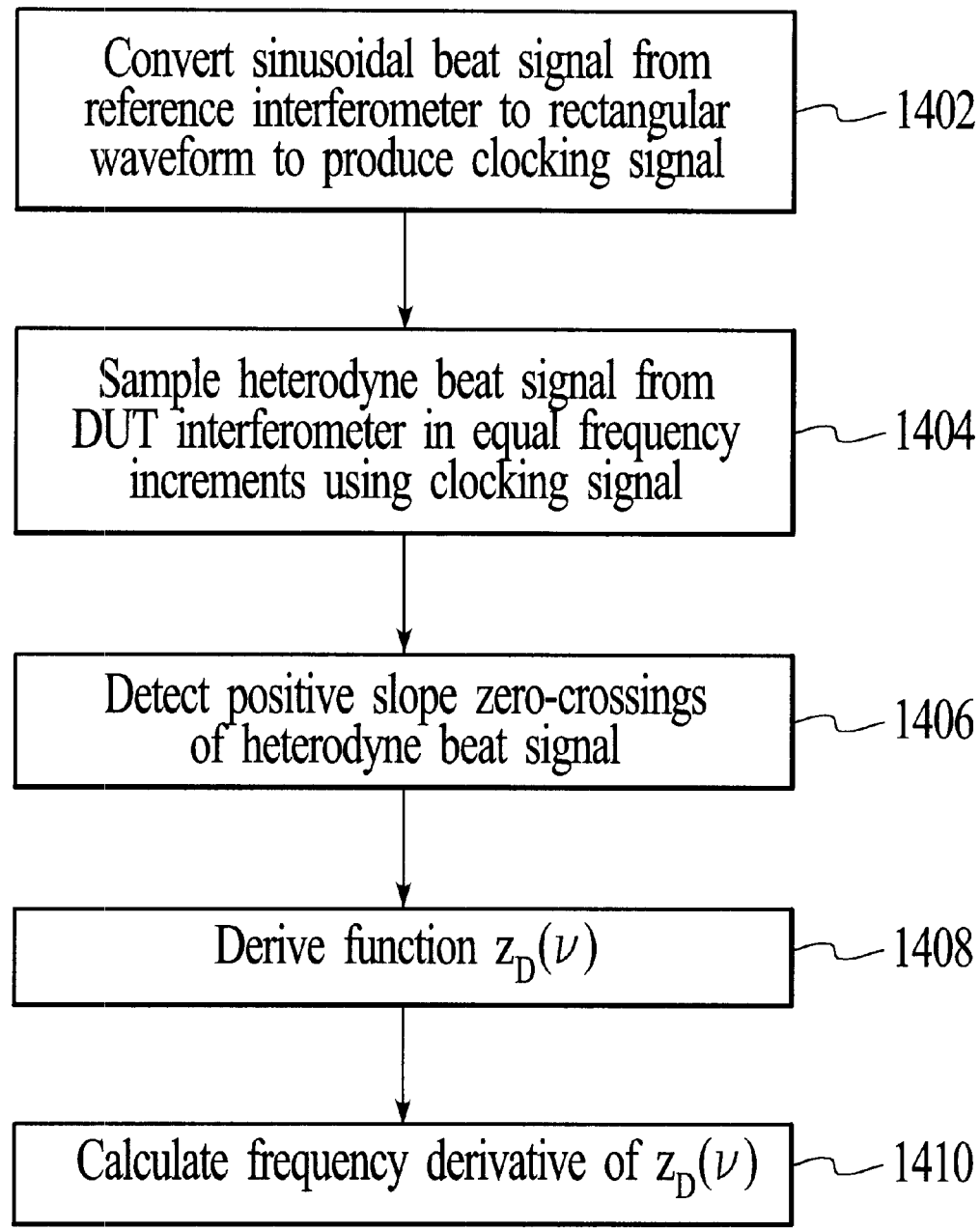
FIG. 14 is a process flow diagram of the operation of the processing module in accordance with the hardware-based sampling approach of the second embodiment.
Figure 15:
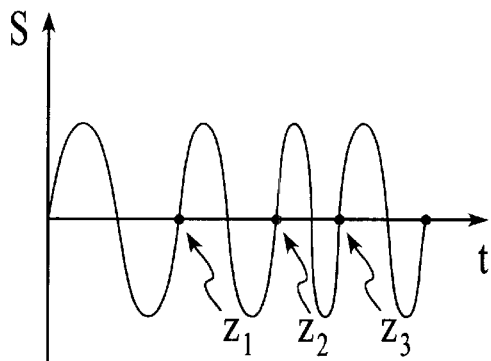
FIG. 15 illustrates an input wave for a squaring circuit of the processing module of FIG. 13.
Figure 16:
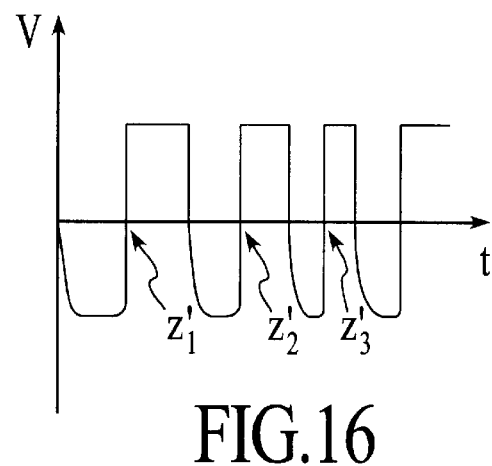
FIG. 16 illustrates an output wave produced by the squaring circuit of the processing module of FIG. 13.

The operation of the processing module 110 in accordance with the hardware-based sampling approach of the second embodiment is described with reference to FIG. 14. At step 1402, a sinusoidal beat signal from the reference interferometer 106 is converted to a rectangular waveform by the squaring circuit 1302 to produce a clocking signal. The sinusoidal beat signal received by the squaring circuit is illustrated in FIG. 15. The zero-crossings of the sinusoidal beat signal are denoted by points $z_1$, $z_2$, $z_3$, etc. The output signal of the squaring circuit is illustrated in FIG. 16. The output signal of FIG. 16 is the sinusoidal beat signal of FIG. 15 that has been converted by the squaring circuit. As shown in FIG. 16, the sinusoidal waveform has been transformed to a signal with sharp edges $z_1'$, $z_2'$ and $z_3'$ that can be used to clock a data acquisition system.

Figure 17:
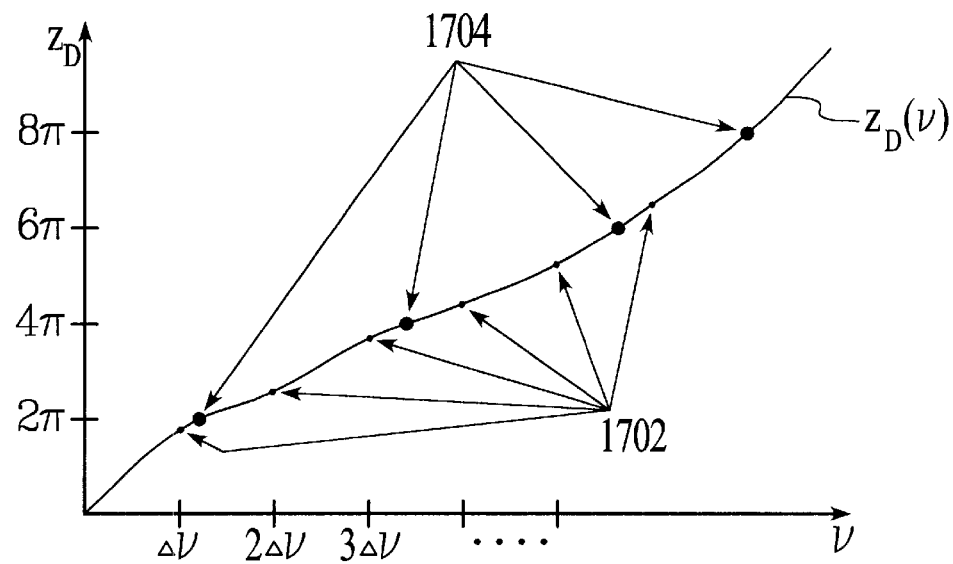
FIG. 17 illustrates a function $z_D(v)$ defined by the zero-crossings of the AC coupled heterodyne beat signal produced by the test interferometer.

Next, at step 1404, a heterodyne beat signal from the test interferometer 108 is sampled (clocked) by the processor 706 in equal frequency increments $\Delta v$, where $\Delta v=1/\tau$, using the clocking signal. At step 1406, positive slope zero-crossings of the heterodyne beat signal from the test interferometer are detected by the DUT zero-crossing detector 704 of the processing module 110. Next, at step 1408, a function $z_D(v)$ is derived by the processor using the zero-crossings detected by the DUT zero-crossing detector. The function $z_D(v)$ is shown in FIG. 17. The samples derived from step 1404 are illustrated in FIG. 17 as points 1702. The points 1704 are the positive slope zero-crossings of the heterodyne beat signal from the test interferometer detected in step 1406. At step 1410, the frequency derivative of the function $z_D(v)$ is calculated by the processor. This is equivalent to calculating the group delay $\tau_g$ as:

$$\tau_g = \frac{dz_D(v)}{dv}. \tag{6}$$

Since the function $z_D(v)=\Theta(v)$, the above equation can be rewritten as:

$$\tau_g = \frac{d\Theta(\omega)}{d\omega},$$

where $\omega=2\pi v$. Therefore, the equation (6) is equivalent to the definition of group delay.

In a practical numerical approach, the derivative of the function $z_D(v)$ with respect to frequency can be calculated by computing $dv/dz_D$, as adjacent positive slope zero-crossings are equally spaced by $2\pi$, as illustrated in FIG. 17. In this approach, the group delay $\tau_g$ for the optical DUT is computed by the processor using the equation:

$$\tau_g = \frac{1}{\frac{dv}{dz_D}}.$$

Figure 18:
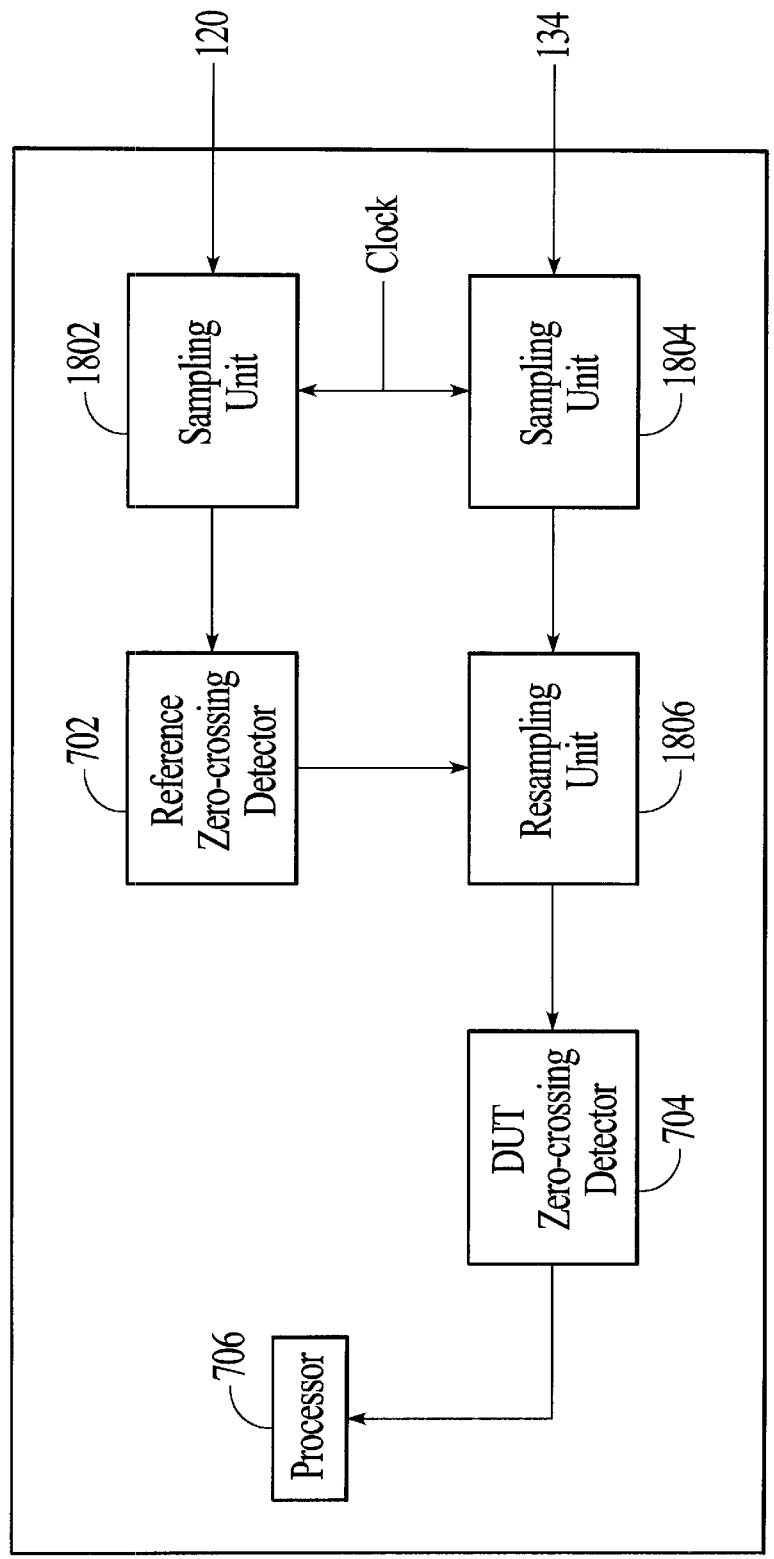
FIG. 18 is a block diagram of the processing module of the optical network analyzer in accordance with a software-based sampling approach of the second embodiment of the invention.

In a software-based sampling approach of the second embodiment, the processing module 110 includes the reference zero-crossing detector 702, DUT zero-crossing detector 704, the processor 706, sampling units 1802 and 1804, and a resampling unit 1806, as shown in FIG. 18. The sampling units 1802 and 1804 operate to sample the heterodyne beat signals from the reference and the DUT detectors 120 and 134, respectively, in equal time increment. The sampled reference heterodyne beat signal is transmitted to the reference zero-crossing detector, where positive slope zero-crossings of the reference heterodyne beat signal are detected. The detected zero-crossings are then transmitted to the resampling unit, where the sampled DUT heterodyne beat signal is resampled in equal optical frequency increments using the detected zero-crossings of the reference heterodyne beat signal. In order to resample the DUT heterodyne beat signal, the sampled DUT heterodyne beat signal needs to be interpolated to obtain information between the sampled data points of the DUT heterodyne beat signal. As stated above, since adjacent positive slope zero-crossings of the reference heterodyne beat signal by definition are separated by $2\pi$, the sampled data points of the DUT heterodyne beat signal are equally spaced in frequency. The DUT zero-crossing detector 704 and the processor 706 operate in the same manner as described above for the hardware-based sampling approach to calculate the group delay.

In the first and second embodiments, the laser source included in the optical network analyzers is a tunable laser source that continuously sweeps across a predefined range of frequencies in a non-uniform manner. However, if the laser source can continuously sweep across a predefined range of frequencies in a uniform manner, then there is no need to compensate or adjust the heterodyne beat signal from the test interferometer to compute the group delay. Thus, if such a laser source is used, the reference interferometer is no longer needed.

Figure 19:
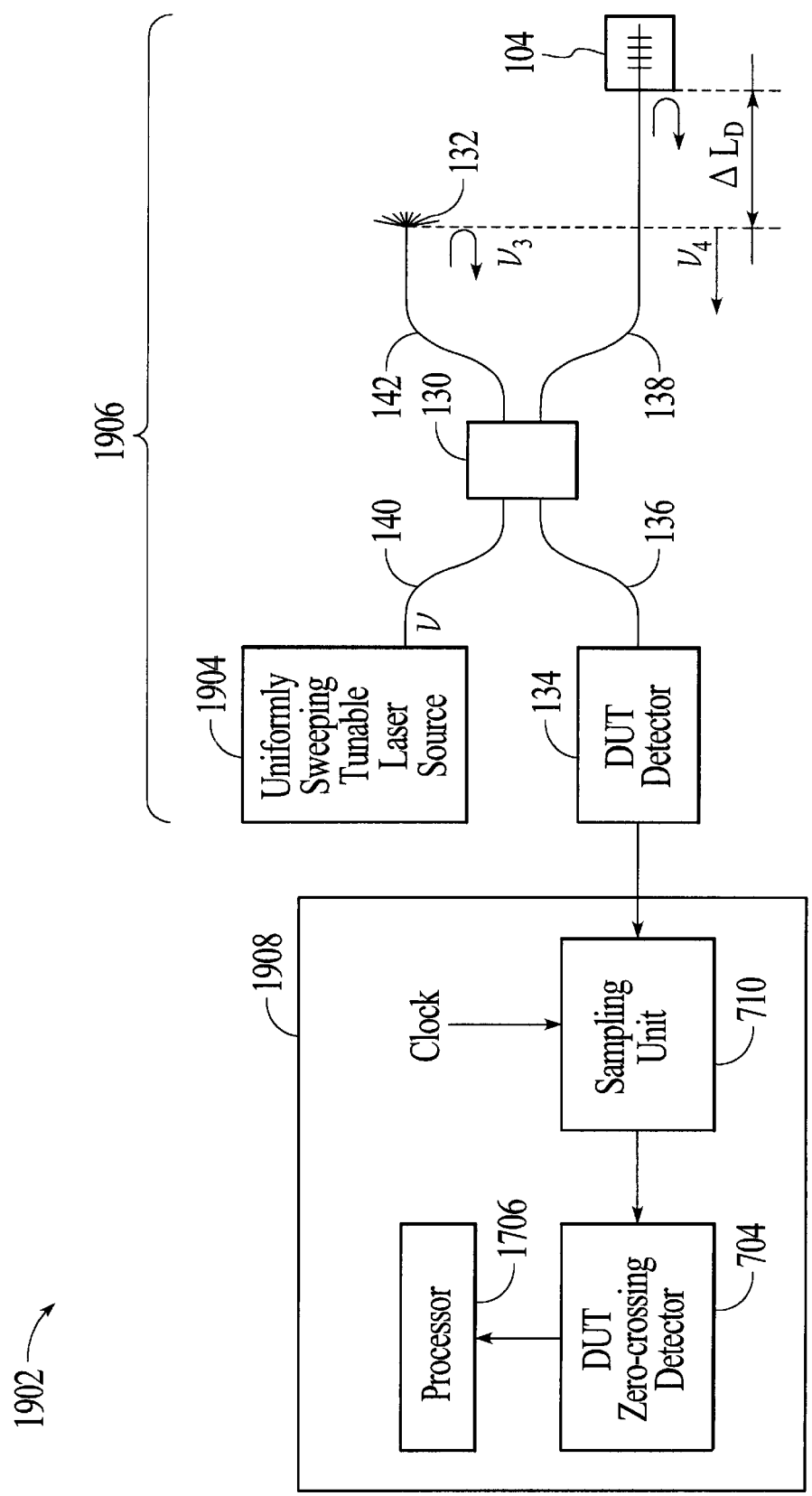
FIG. 19 is a block diagram of an optical network analyzer that utilizes a uniformly sweeping tunable laser source in accordance with the present invention.

Turning to FIG. 19, an optical analyzer 1902 that utilizes a uniformly sweeping tunable laser source 1904 is shown. The optical analyzer includes a test interferometer 1906 and a processing module 1908. Similar to the test interferometer 108 of the optical analyzer 102, the test interferometer 1906 includes the optical coupler 130, the mirror 132, the optical DUT 104 and the DUT detector 134. In addition, the test interferometer 1906 includes the uniformly sweeping tunable laser source. The test interferometer 1906 operates to produce a heterodyne beat signal from the input optical signal, which is generated by the uniformly sweeping tunable laser source. Since the input optical signal is generated by the uniformly sweeping tunable laser source, the optical analyzer 1902 does not include an optical frequency counter, e.g., a reference interferometer, to compensate for the input optical signal.

The processing module 1908 of the optical analyzer 1902 includes the sampling unit 710, the DUT zero-crossing detector and the processor 706. In operation, the sampling unit 710 receives the heterodyne beat signal from the test interferometer 1906 and then samples the signal in equal time increments using a clock signal. The sampled heterodyne beat signal is transmitted to the DUT zero-crossing detector 704, which detects the positive zero-crossings of the sampled signal. The detected zero-crossings are then used by the processor 706 to derive a function $z_D(t)$. Next, a derivative of the function $z_D(t)$ with respect to time is calculated by the processor to provide a group delay measurement of the DUT 104.

Figure 20:
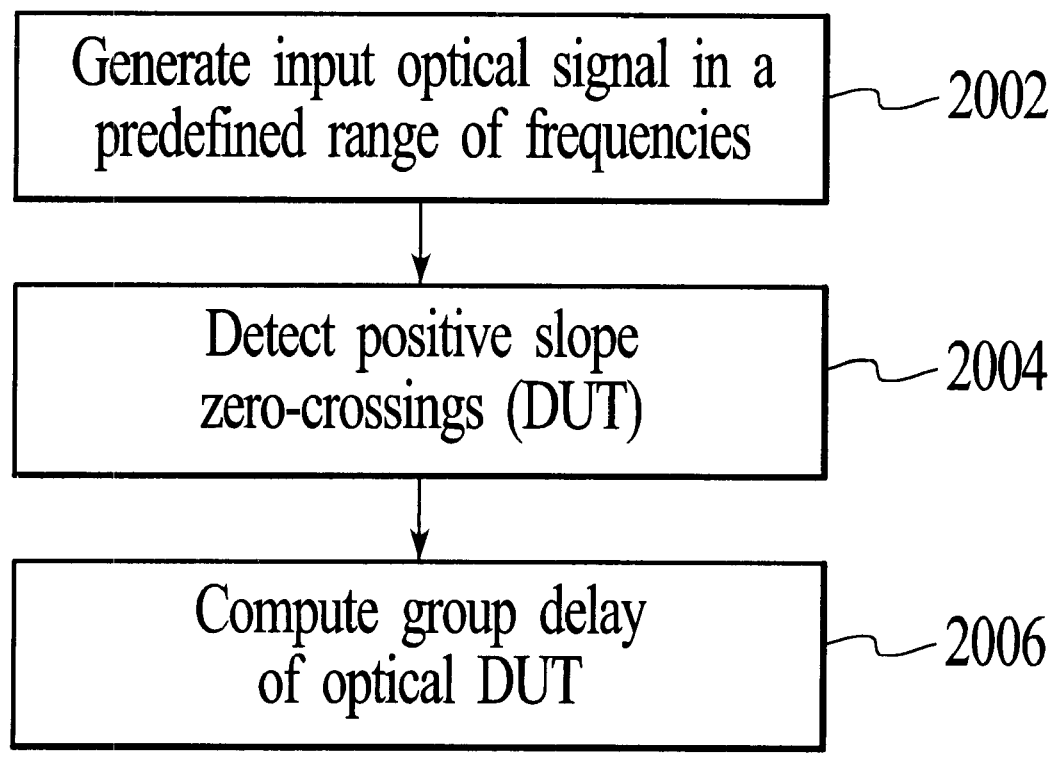
FIG. 20 is a process flow diagram of a method for analyzing an optical characteristic of an optical device under test in accordance with the invention.

A method of measuring the phase response of an optical DUT is described with reference to FIG. 20. At step 2002, an input optical signal having a frequency that varies with time is generated into a test interferometer that includes the optical DUT. At step 2004, the positive slope zero-crossings of an AC coupled heterodyne beat signal produced by the test interferometer from the input optical signal are detected. Next, at step 2006, the group delay of the optical DUT is computed using a derivative of a DUT zero-crossings function defined by the positive slope zero-crossings with respect to a variable of the DUT zero-crossings function. The computed group delay is indicative of the phase response of the optical DUT.

Assuming that the frequency of the input optical signal varies non-uniformly with time, the method may further include steps of detecting the optical frequency of the input optical signal and compensating the heterodyne beat signal produced by the test interferometer for the non-uniform frequency variations of the input optical signal. The optical frequency of the input optical signal may be detected using a reference interferometer.

In one embodiment, the group delay is computed by dividing the derivative of the DUT zero-crossings function with respect to time by a derivative of a reference zero-crossings function with respect to time. In this embodiment, the time derivatives of the reference zero-crossings function and the DUT zero-crossings function are calculated by detecting positive slope zero-crossings of the heterodyne beat signals resulting from the input optical signal that is transmitted into the reference interferometer 106 and into the test interferometer 108. In another embodiment, the group delay is computed by approximating the derivative of the DUT zero-crossings function with respect to optical frequency. In this embodiment, the positive slope zero-crossings from the reference interferometer are used to sample the DUT heterodyne beat signal in equal frequency increments to determine the DUT zero-crossings function and to calculate the frequency derivative of the DUT zero-crossings function.

What is claimed is:

1. A method of measuring a group delay of an optical device under test (DUT) comprising:
   generating an input optical signal having a frequency that varies with time into a test interferometer, said test interferometer including said optical DUT;
   detecting DUT zero-crossings of a DUT heterodyne beat signal from said test interferometer; and
   computing a group delay of said optical DUT using a derivative of a DUT zero-crossings function defined by said DUT zero-crossings with respect to one of time and optical frequency of said DUT zero-crossings function.

2. The method of claim 1 further comprising detecting an optical frequency of said input optical signal and compensating for non-uniform frequency changes of said input optical signal.

3. The method of claim 2 wherein said detecting of said optical frequency of said input optical signal includes detecting zero-crossings of a reference heterodyne beat signal from a reference interferometer.

4. The method of claim 1 wherein said computing of said group delay includes calculating said derivative of said DUT zero-crossings function with respect to time, said derivative of said DUT zero-crossings function with respect to time providing information about changes in phase of said DUT heterodyne beat signal.

5. The method of claim 4 wherein said calculating of said derivative of said DUT zero-crossings function with respect to time includes sampling said DUT zero-crossings function in equal time increments.

6. The method of claim 4 further comprising:
   detecting reference zero-crossings of a reference heterodyne beat signal from a reference interferometer; and
   calculating a derivative of a reference zero-crossings function defined by said reference zero-crossings with respect to time, said derivative of said reference zero-crossings function with respect to time providing information about changes in optical frequency of said input optical signal.

7. The method of claim 6 wherein said computing of said group delay includes dividing said derivative of said DUT zero-crossings function by said derivative of said reference zero-crossings function.

8. The method of claim 1 wherein said computing of said group delay includes calculating said derivative of said DUT zero-crossings function with respect to optical frequency.

9. The method of claim 8 wherein said calculating of said derivative of said DUT zero-crossings function with respect to optical frequency includes sampling said DUT heterodyne beat signal in equal frequency increments.

10. The method of claim 9 wherein said calculating of said derivative of said DUT zero-crossings function with respect to optical frequency includes detecting an optical frequency of said input optical signal to derive a clocking signal for said sampling of said DUT heterodyne beat signal in equal frequency increments.

11. The method of claim 9 wherein said step of calculating said derivative of said DUT zero-crossings function with respect to optical frequency further includes using reference zero-crossings of a reference heterodyne beat signal from a reference interferometer as a clocking signal to sample said DUT heterodyne beat signal in equal frequency increments.

12. The method of claim 8 wherein said step of calculating said derivative of said DUT zero-crossings function with respect to optical frequency includes calculating changes of optical frequency of said DUT heterodyne beat signal with respect to equal phase increments defined by said DUT zero-crossings.

13. A system for measuring a group delay of an optical device under test (DUT) comprising:
   a light source that generates an input optical having a frequency that varies with time;
   a test interferometer optically coupled to said light source to receive said input optical signal, said test interferometer including said optical DUT;
   a DUT zero-crossing detector coupled to said test interferometer to detect DUT zero-crossings of a DUT heterodyne beat signal from said test interferometer; and
   a processor configured to calculate a derivative of a DUT zero-crossings function defined by said DUT zero-crossings with respect to one of time and optical frequency of said DUT zero-crossings function, said processor being further configured to compute a group delay of said optical DUT using said derivative of said DUT zero-crossings function.

14. The system of claim 13 further comprising an optical frequency counter that is configured to detect the optical frequency of said input optical signal, said optical frequency being used to compensate for the frequency sweep non-uniformity of said light source.

15. The system of claim 14 wherein said optical frequency counter includes a reference interferometer that generates a reference heterodyne beat signal from said input optical signal, said reference heterodyne beat signal being associated with said optical frequency of said input optical signal.

16. The system of claim 15 wherein said optical frequency counter is configured to detect zero-crossings of said reference heterodyne beat signal from said reference interferometer to measure said optical frequency of said input optical signal.

17. The system of claim 13 wherein said processor is configured to calculate said derivative of said DUT zero-crossings function with respect to time, said derivative of said DUT zero-crossings function with respect to time providing information about changes in phase of said DUT heterodyne beat signal.

18. The system of claim 17 wherein said processor is further configured to sample said DUT zero-crossings function in equal time increments to approximate said derivative of said DUT zero-crossings function with respect to time.

19. The system of claim 13 further comprising a reference interferometer optically coupled to said light source to receive said input optical signal to produce a reference heterodyne beat signal.

20. The system of claim 19 further comprising a reference zero-crossing detector optically coupled to said reference interferometer, said reference zero-crossing detector being configured to detect reference zero-crossings of said reference heterodyne beat signal, said processor being configured to calculate a derivative of a reference zero-crossings function defined by said reference zero-crossings with respect to time, said derivative of said reference zero-crossings function with respect to time providing information about changes in optical frequency of said input optical signal.

21. The system of claim 19 wherein said processor is configured to calculate said derivative of said DUT zero-crossings function with respect to optical frequency by calculating changes of optical frequency of said DUT heterodyne beat signal with respect to equal phase increments defined by said DUT zero-crossings.

22. The system of claim 21 wherein said processor is configured to sample said DUT zero-crossings function in equal frequency increments by using said reference zero-crossings of said reference heterodyne beat signal.

23. The system of claim 22 further comprising a wave converter coupled to said reference interferometer, said wave converter being configured to convert said reference heterodyne beat signal from said reference interferometer from a sinusoidal waveform to a rectangular-like waveform, said converted reference heterodyne beat signal being used by said processor as a clocking signal to sample said DUT heterodyne beat signal in said equal frequency increments.

24. A method of measuring a group delay of an optical device under test (DUT) comprising:

transmitting an input optical signal having a frequency that varies with time into a test interferometer and a reference interferometer, said test interferometer including said optical DUT;

detecting DUT zero-crossings of a DUT heterodyne beat signal produced by said test interferometer from said input optical signal;

calculating a derivative of a DUT zero-crossing function defined by said DUT zero-crossings with respect to time;

detecting reference zero-crossings of a reference heterodyne beat signal produced by said reference interferometer from said input optical signals;

calculating a derivative of a reference zero-crossing function defined by said reference zero-crossings with respect to time; and computing a group delay of said optical DUT using said derivative of said DUT zero-crossing function and said derivative of said reference zero-crossing function, said computed group delay being indicative of a phase response of said optical DUT.

25. The method of claim 24 wherein said generating of said input optical signal includes generating said input optical signal using a tunable laser source that is configured to sweep a predefined range of frequencies.

26. The method of claim 24 wherein said calculating of said derivative of said DUT zero-crossing function and said calculating of said derivative of said reference zero-crossing function include sampling said DUT zero-crossing function and said reference zero-crossing function in equal time increments.

27. The method of claim 24 wherein said computing of said group delay includes dividing said derivative of said DUT zero-crossing function by said derivative of said reference zero-crossing function, said derivative of said DUT zero-crossing function providing information about changes in phase of said DUT heterodyne beat signal, said derivative of said reference zero-crossing function providing information about changes in optical frequency of said input optical signal.

* * * * *